(12) United States Patent
Ko et al.

(10) Patent No.: US 11,555,951 B2
(45) Date of Patent: Jan. 17, 2023

(54) DISPLAY DEVICE AND FABRICATION METHOD OF THE SAME

(71) Applicant: E Ink Holdings Inc., Hsinchu (TW)

(72) Inventors: Chih-Cheng Ko, Hsinchu (TW); Yun-Nan Hsieh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 283 days.

(21) Appl. No.: 16/903,396

(22) Filed: Jun. 17, 2020

(65) Prior Publication Data
US 2020/0400866 A1 Dec. 24, 2020

Related U.S. Application Data

(60) Provisional application No. 62/865,321, filed on Jun. 24, 2019.

(51) Int. Cl.
*G02B 5/02* (2006.01)
*G02B 6/42* (2006.01)
*F21V 8/00* (2006.01)

(52) U.S. Cl.
CPC .......... *G02B 5/0294* (2013.01); *G02B 6/0028* (2013.01); *G02B 6/4253* (2013.01); *G02B 6/4259* (2013.01)

(58) Field of Classification Search
CPC ...... G02B 6/0028; G02B 6/42; G02B 6/4253; G02B 6/4259
See application file for complete search history.

(56) References Cited

U.S. PATENT DOCUMENTS

| | | | |
|---|---|---|---|
| 7,223,008 B2 | 5/2007 | Henriet et al. | |
| 9,671,555 B2 | 6/2017 | He et al. | |
| 9,857,916 B2 | 1/2018 | Bergström et al. | |
| 2003/0030763 A1* | 2/2003 | Nishioka | G02B 6/0038 349/61 |
| 2005/0185389 A1 | 8/2005 | Henriet et al. | |
| 2011/0216042 A1* | 9/2011 | Wassvik | G06F 3/0428 345/175 |
| 2015/0205441 A1 | 7/2015 | Bergstrom et al. | |
| 2017/0168344 A1 | 6/2017 | Song et al. | |

(Continued)

FOREIGN PATENT DOCUMENTS

| | | |
|---|---|---|
| CN | 203397317 U | 1/2014 |
| CN | 204010550 U | 12/2014 |

(Continued)

OTHER PUBLICATIONS

Corresponding Taiwan office action dated Feb. 22, 2021.
Corresponding Chinese office action dated Dec. 15, 2021.

*Primary Examiner* — Tina M Wong
(74) *Attorney, Agent, or Firm* — CKC & Partners Co., LLC

(57) ABSTRACT

A display device includes a cover structure, a light guide plate, and a display panel. The cover structure includes an anti-glare layer, a light blocking frame, and an adhesive layer. The anti-glare layer has a display region and an non-display region. The light blocking frame surrounds a receiving space. An orthogonal projection of the light blocking frame on the anti-glare layer is located within the non-display region. An adhesive layer is located in the receiving space of the light blocking frame. The light guide plate is located on the surface of the adhesive layer facing away from the anti-glare layer. The display panel is adjacent to the light guide plate.

17 Claims, 16 Drawing Sheets

(56) References Cited

U.S. PATENT DOCUMENTS

2018/0052312 A1 2/2018 Jia et al.
2020/0400866 A1* 12/2020 Ko ..................... G02B 5/0294

FOREIGN PATENT DOCUMENTS

| CN | 105336270 | A | 2/2016 |
| CN | 205281983 | U | 6/2016 |
| CN | 207115887 | U | 3/2018 |
| CN | 207381012 | U | 5/2018 |
| CN | 109637364 | A | 4/2019 |
| JP | H10186333 | A | 7/1998 |
| TW | I622970 | B | 5/2018 |
| TW | 201911555 | A | 3/2019 |

* cited by examiner

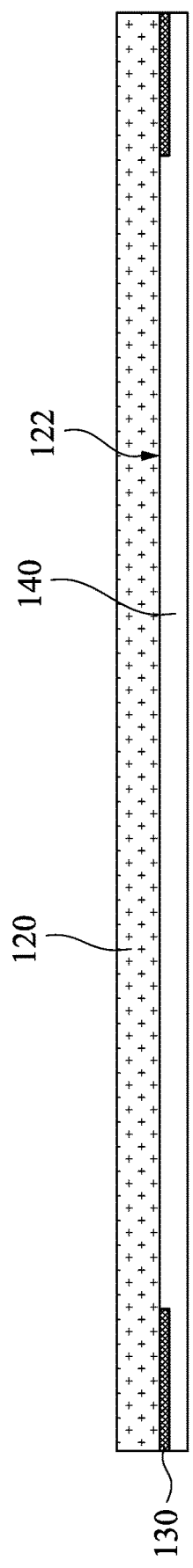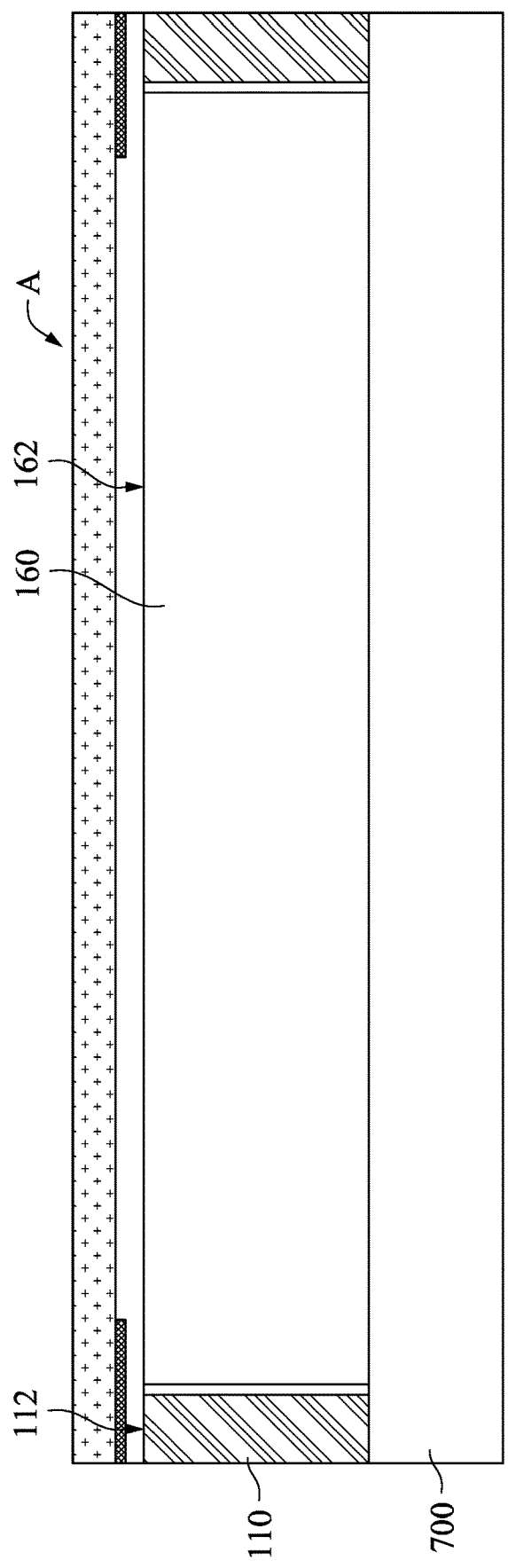

DISPLAY DEVICE AND FABRICATION METHOD OF THE SAME

CROSS-REFERENCE TO RELATED APPLICATION

This application claims priority to U.S. Provisional Application Ser. No. 62/865,321, filed Jun. 24, 2019, which is herein incorporated by reference in its entirety.

BACKGROUND

Field of Invention

The present invention relates to an display device and a fabrication method of the display device.

Description of Related Art

A front light module or a back light module of a display device are commonly combined with the cover structure. When the light from the light source is transmitted to the cover structure after being guided by the light guide plate, a portion of the light may be transmitted toward a side of the cover structure after entering the cover structure. Therefore, if the side of the cover structure has no structure that can block light or absorb light, the light may leak from the gap. As a result, the display quality of the display device may be degraded.

Accordingly, it is still a development direction for the industry to provide a cover structure that may prevent light leaks.

SUMMARY

One aspect of the present disclosure is a display device.

In some embodiments, the display device includes a cover structure, a light guide plate, and a display panel. The cover structure includes an anti-glare layer, a light blocking frame, and an adhesive layer. The anti-glare layer has a display region and an non-display region. The light blocking frame surrounds a receiving space. An orthogonal projection of the light blocking frame on the anti-glare layer is located within the non-display region. An adhesive layer is located in the receiving space of the light blocking frame. The light guide plate is located on the surface of the adhesive layer facing away from the anti-glare layer. The display panel is adjacent to the light guide plate.

In some embodiments, the light blocking frame has an inner wall, the light blocking frame surrounds the adhesive layer, and the adhesive layer is in contact with the inner wall.

In some embodiments, a surface of the anti-glare layer facing the receiving space is in contact with the adhesive layer.

In some embodiments, the display device further includes a light blocking coating layer and an optical adhesive layer. The light blocking coating layer is located between the light blocking frame and the anti-glare layer. The optical adhesive layer is at least located between the light-blocking coating layer and the light-blocking frame.

In some embodiments, an orthogonal projection of the light blocking coating layer on the anti-glare layer is overlapped with the non-display region.

In some embodiments, an orthogonal projection of the light blocking frame on the anti-glare layer is overlapped with the non-display region.

In some embodiments, an orthogonal projection of the light blocking coating layer on the anti-glare layer is overlapped with an entirety of the orthogonal projection of the light blocking frame on the anti-glare layer.

In some embodiments, a surface of the anti-glare layer facing the light blocking frame is in contact with the optical adhesive layer.

In some embodiments, an orthogonal projection of the optical adhesive layer on the anti-glare layer is overlapped with the display region.

In some embodiments, the display device further includes a transparent plate located in the receiving space, and the transparent plate is in contact with the optical adhesive layer.

In some embodiments, an orthogonal projection of the transparent plate on the anti-glare layer is overlapped with the orthogonal projection of the light blocking coating layer on the anti-glare layer.

In some embodiments, the optical adhesive layer and the light blocking frame collectively surround the adhesive layer.

In some embodiments, the anti-glare layer is in contact with a surface of the light blocking frame facing the anti-glare layer.

In some embodiments, the display device further includes a transparent plate located in the receiving space, the light blocking frame surrounds the transparent plate, and the transparent plate is in contact with the anti-glare layer.

In some embodiments, the adhesive layer is located between the transparent plate and the light blocking frame.

In some embodiments, a part of the light blocking frame is located between the anti-glare layer and the transparent plate.

In some embodiments, a surface of the light blocking frame facing the anti-glare layer is aligned with a surface of the transparent plate facing the anti-glare layer.

In some embodiments, the display device further includes a housing surrounding the cover structure, and the light blocking frame is located between the housing and the adhesive layer.

Another aspect of the present disclosure is a fabrication method of a display device.

In some embodiments, the fabrication method of a display device includes forming a light blocking coating layer on an anti-glare layer; coating an optical adhesive layer on the anti-glare layer and the light blocking coating layer; attaching the optical adhesive layer on a light blocking frame and a transparent plate; and forming an adhesive layer between the light blocking frame and the transparent plate.

Another aspect of the present disclosure is a fabrication method of a display device.

In some embodiments, the fabrication method of a display device includes providing a transparent plate and a light blocking frame surrounding the transparent plate; forming an adhesive layer between the light blocking frame and the transparent plate; imprinting an UV curing glue on the light blocking frame and the transparent plate; and curing the imprinted UV curing glue to form an anti-glare layer In the aforementioned embodiments, the cover structure of the present disclosure may block or absorb the light by the light blocking frame. As such, degradation of the display quality due to leaking of the light from the gap may be prevented.

BRIEF DESCRIPTION OF THE DRAWINGS

The invention can be more fully understood by reading the following detailed description of the embodiment, with reference made to the accompanying drawings as follows:

FIGS. 3B to 3D are cross-sectional views of different steps of a fabrication method of the cover structure in FIG. 3A;

DETAILED DESCRIPTION

Figure 1:
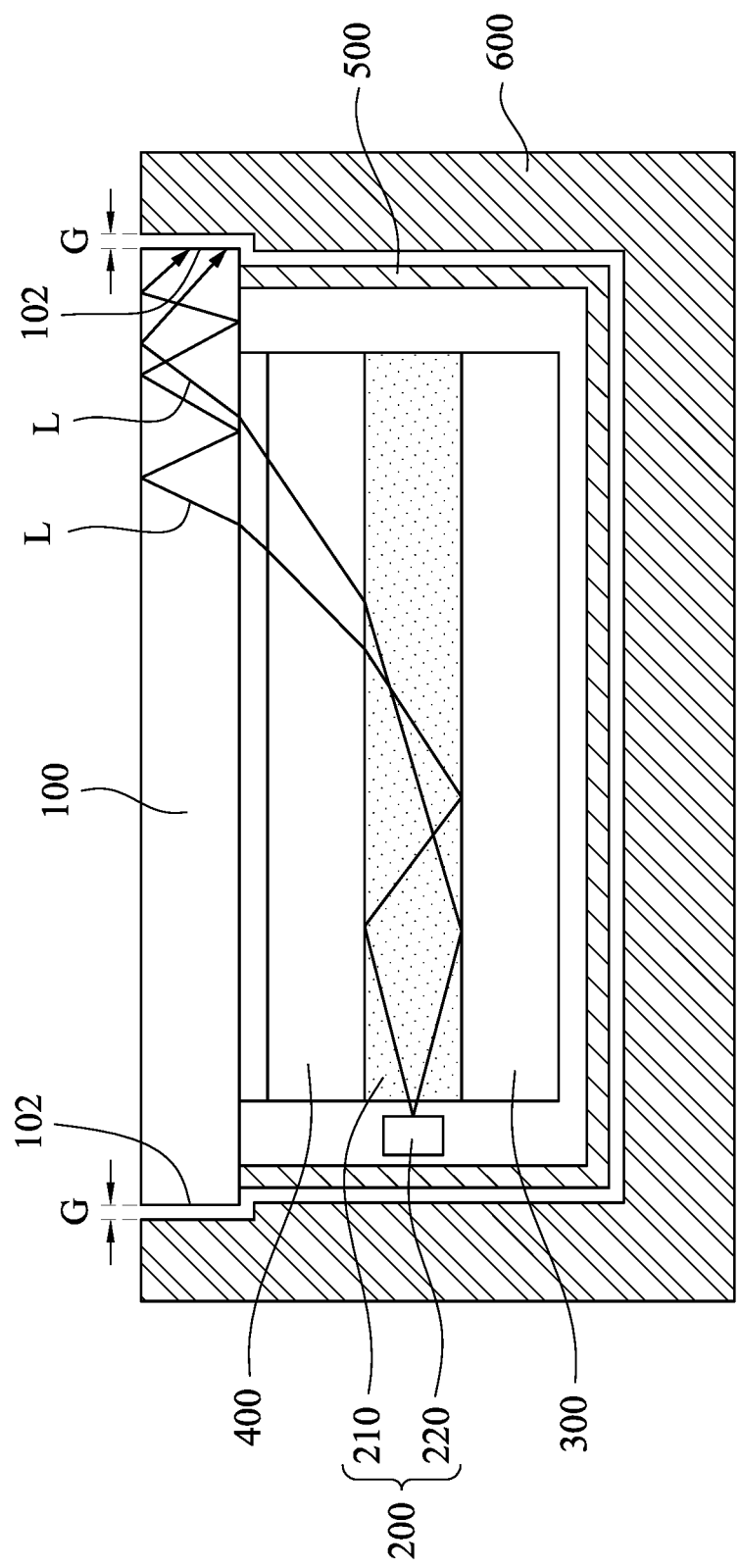
FIG. 1 is a cross-sectional view of a display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a cross-sectional view of a display device 10 according to one embodiment of the present disclosure. The display device 10 includes a cover structure 100, a light guide plate 210, a light source 220, and a display panel 300. The light guide plate 210 is located between the cover structure 100 and the display panel 300. The display panel 300 is adjacent to the light guide plate 210. In the present embodiment, the display panel 300 is a reflective display panel. The light guide plate 210 and the light source 220 form a front light module 200, but the present disclosure is not limited in this regard. In other embodiments, the display panel 300 is a transmissive display panel. The display panel 300 is located between the light guide plate 210 and the cover structure 100. The light guide plate 210 and the light source 220 form a back light module.

In the present embodiment, the display device 10 further includes a functional module 400, an outer frame 500, and a housing 600. The functional module 400, for example, may be a touch module, a stress buffer structure, or a light guide medium layer, but the present disclosure is not limited in these regards. In some embodiments, the display device 100 may has no functional module 400. The outer frame 500 is located below the cover structure 100, and the outer frame 500 surrounds the light guide plate 210, the light source 220, the display panel 300, and the functional module 400. The housing 600 surrounds the cover structure 100 and the outer frame 500. There is a gap G between a side 102 of the cover structure 100 and the housing 600 so as to buffer the stress between the cover structure 100 and the housing 600. In the present embodiment, the light L emitted from the light source 200 is guided by the light guide plate 210 to pass the functional module 400, and then the light L is transmitted to the cover structure 100. A portion of the light L may be transmitted toward the side 102 of the cover structure 100 after entering the cover structure 100. Therefore, if the side 102 of the cover structure 100 has no structure that can block light or absorb light, the light L may leak from the gap G. As a result, the display quality of the display device 10 may be degraded.

Figure 2:
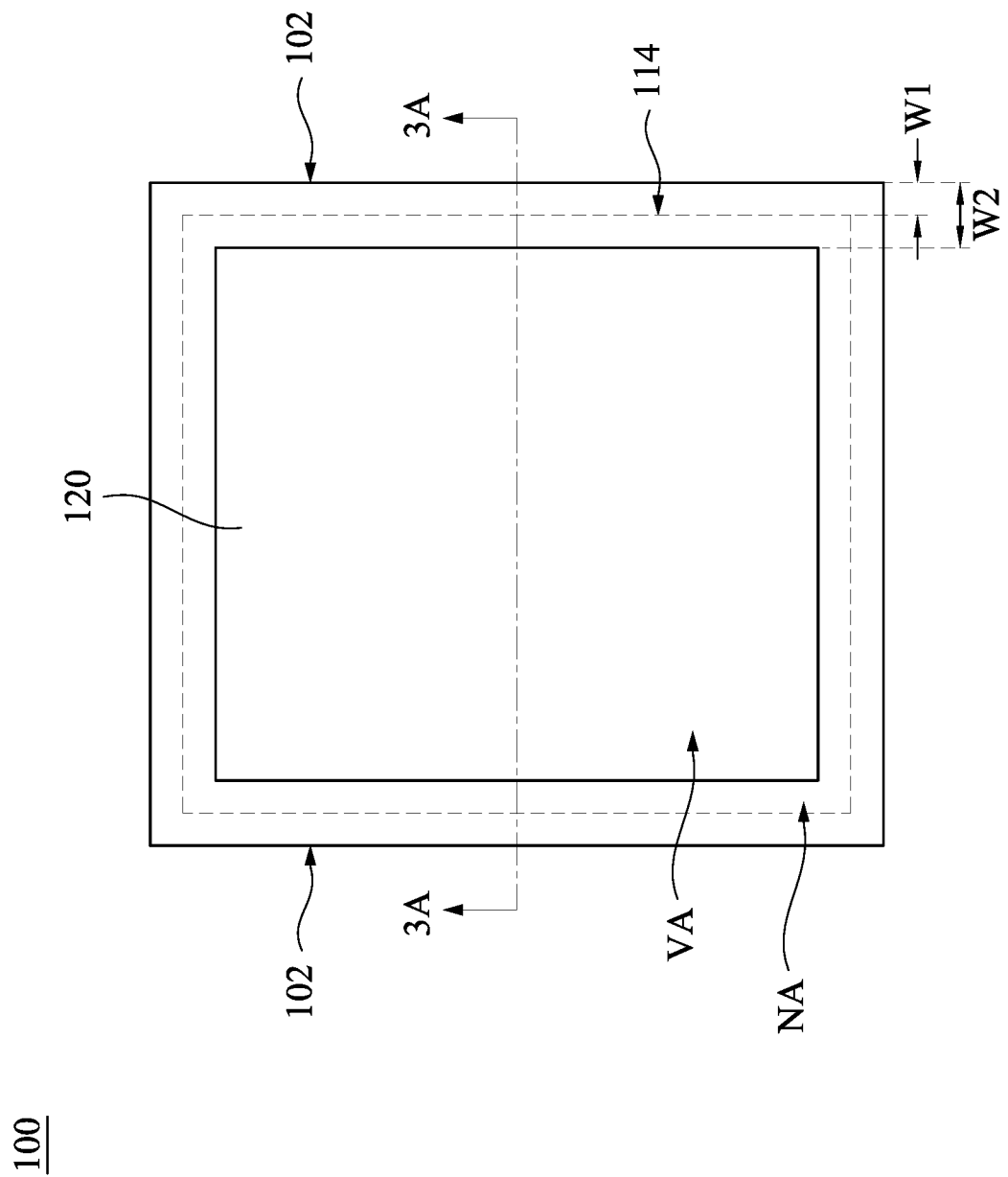
FIG. 2 is a top view of the cover structure in FIG. 1.
Figure 3A:
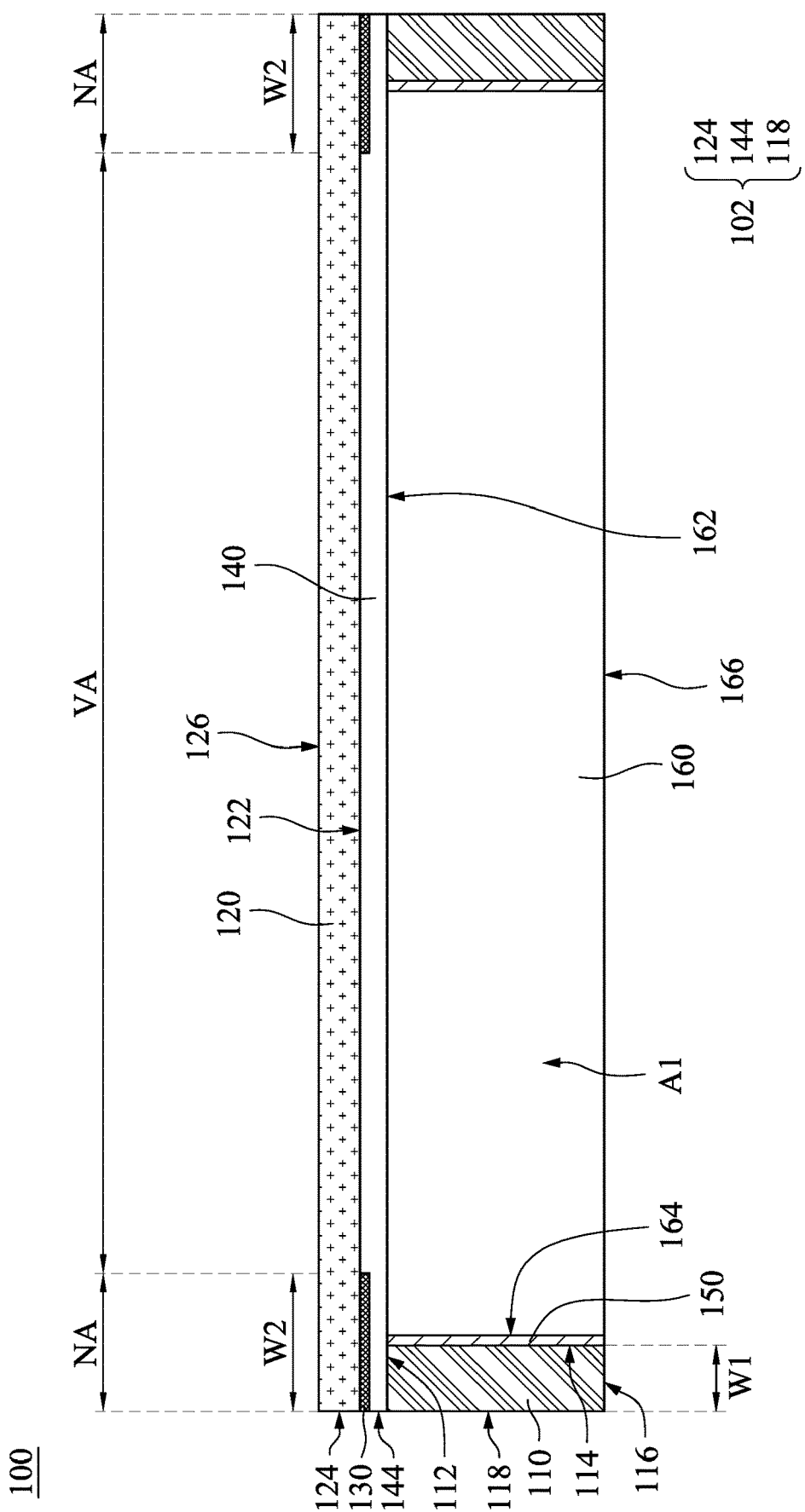
FIG. 3A is a cross-sectional view taken along line 3A-3A in FIG. 2.

FIG. 2 is a top view of the cover structure 100 in FIG. 1. FIG. 3A is a cross-sectional view taken along line 3A-3A in FIG. 2. Reference is made to FIG. 2 and FIG. 3A simultaneously. The cover structure 100 includes a light blocking frame 110, an anti-glare layer 120, a light blocking coating layer 130, an optical adhesive layer 140, and an adhesive layer 150. The light blocking frame 110 surrounds a receiving space A1. The adhesive layer 150 is located in the receiving space A1 of the light blocking frame 110. In other words, the light blocking frame 110 surrounds the adhesive layer 150. The light blocking frame 110 has an inner wall 114, and the adhesive layer 150 is in contact with the inner wall 114. As shown in FIG. 1 and the FIG. 3A, the light blocking frame 110 is located between the housing 600 and adhesive 150.

In the present embodiment, the anti-glare layer 120 is formed through coating an anti-glare coating (AG coating) on a surface 126 of a plate. The light blocking coating layer 130 is printed on another surface 122 opposite to the surface 126. In the present embodiment, the plate used for coating the AG coating may include Polyethylene terephthalate (PET) and/or Polycarbonate (PC), but the present disclosure is not limited in this regard. The light blocking coating layer 130, for example, may be black or dark ink, or other material that can absorb light or blocking light.

Reference is made to FIG. 2 and FIG. 3A. The anti-glare layer 120 may include a display region VA and a non-display region NA. The light blocking coating layer 130 is located between the light blocking frame 110 and the anti-glare layer 120. The optical adhesive layer 140 is at least located between the light blocking coating layer 130 and the light blocking frame 110. In the present embodiment, an area of the optical adhesive layer 140 is substantially the same as an area of the anti-glare layer 120. In other words, an orthogonal projection of the optical adhesive layer 140 on the anti-glare layer 120 is overlapped with the display region VA and the non-display region NA. In addition, the surface 122 of the anti-glare layer 120 facing the light blocking frame 110 is in contact with the optical adhesive layer 140 and the light blocking coating layer 130.

Reference is made to FIG. 3A. In the present embodiment, the cover structure 100 further includes a transparent plate 160. The transparent plate 160 is located in the receiving space A1. The transparent plate 160 includes a surface 162, a surface 166, and a sidewall 164. The surface 162 of the transparent plate 160 is in contact with the optical adhesive layer 140, and the surface 162 of the transparent plate 160 is aligned with the surface 112 of the light blocking frame 110. The light blocking frame 110 surrounds the transparent plate 160, and the adhesive layer 150 is located between the light blocking frame 110 and the sidewall 164 of the transparent plate 160. In other words, in the view of FIG. 2, the profile of the sidewall 164 of the transparent plate 160 when viewed from top is slightly smaller than the profile of the inner wall 114 of the light blocking frame 110 when viewed from above. In the present embodiment, the surface 166 of the transparent plate 160 and the surface 116 of the light blocking frame 110 is aligned with the adhesive layer 150. The material of the transparent plate 160, for example, may include Polycarbonate (PC), Polymethyl Methacrylate (PMMA), glass, or combination thereof, but the present disclosure is not limited in this regard.

Accordingly, the side 102 of the cover structure 100 of the present disclosure is collectively formed by the side wall 124, the side wall 144 of the optical adhesive layer 140, and an outer wall 118 of the light blocking frame 110. Therefore, the light L may be blocked or absorbed through the light blocking frame 110 (see FIG. 1). As such, degradation of the display quality due to leaking of the light L from the gap G may be prevented.

Reference is made to FIG. 2 and FIG. 3A. In the present embodiment, the non-display region NA of the anti-glare layer 120 is defined by the light blocking coating layer 130. In other words, the orthogonal projection of the light blocking layer 130 on the anti-glare layer 120 is the non-display region NA. The orthogonal projection of the light blocking layer 130 on the anti-glare layer 120 has a width W2 that is equal to a width of the non-display region NA. The orthogonal projection of the light blocking frame 110 on the anti-glare layer 120 is located within the non-display region NA. The orthogonal projection of the light blocking frame 110 on the anti-glare layer 120 has a width W1. An area of the orthogonal projection of the light blocking frame 110 on the anti-glare layer 120 is smaller than an area of the orthogonal projection of the light blocking layer 130 on the anti-glare layer 120. That is, the width W1 is smaller than the width W2. In other words, the orthogonal projection of the light blocking layer 130 on the anti-glare layer 120 is overlapped with the entirety of the orthogonal projection of the light blocking frame 110 on the anti-glare layer 120.

Reference is made to FIG. 2 and FIG. 3A, the orthogonal projection of the transparent plate 160 on the anti-glare layer 120 is overlapped with the orthogonal projection of the light blocking layer 130 on the anti-glare layer 120. In other words, in the view of FIG. 2, the side wall 164 of the transparent plate 160, the inner wall 114 of the light blocking frame 110, and the adhesive layer 150 can be blocked by the light blocking coating layer 130. With such design, the poor display quality or non-uniform color between the side wall 164 of the transparent plate 160, the inner wall 114 of the light blocking frame 110, and the adhesive layer 150 due to deviation of mediums of those layers may be prevented. In other words, defect of display image caused by the interface between the transparent plate 160 and the light blocking frame 110 may be prevented by employing such design.

Figure 3D:
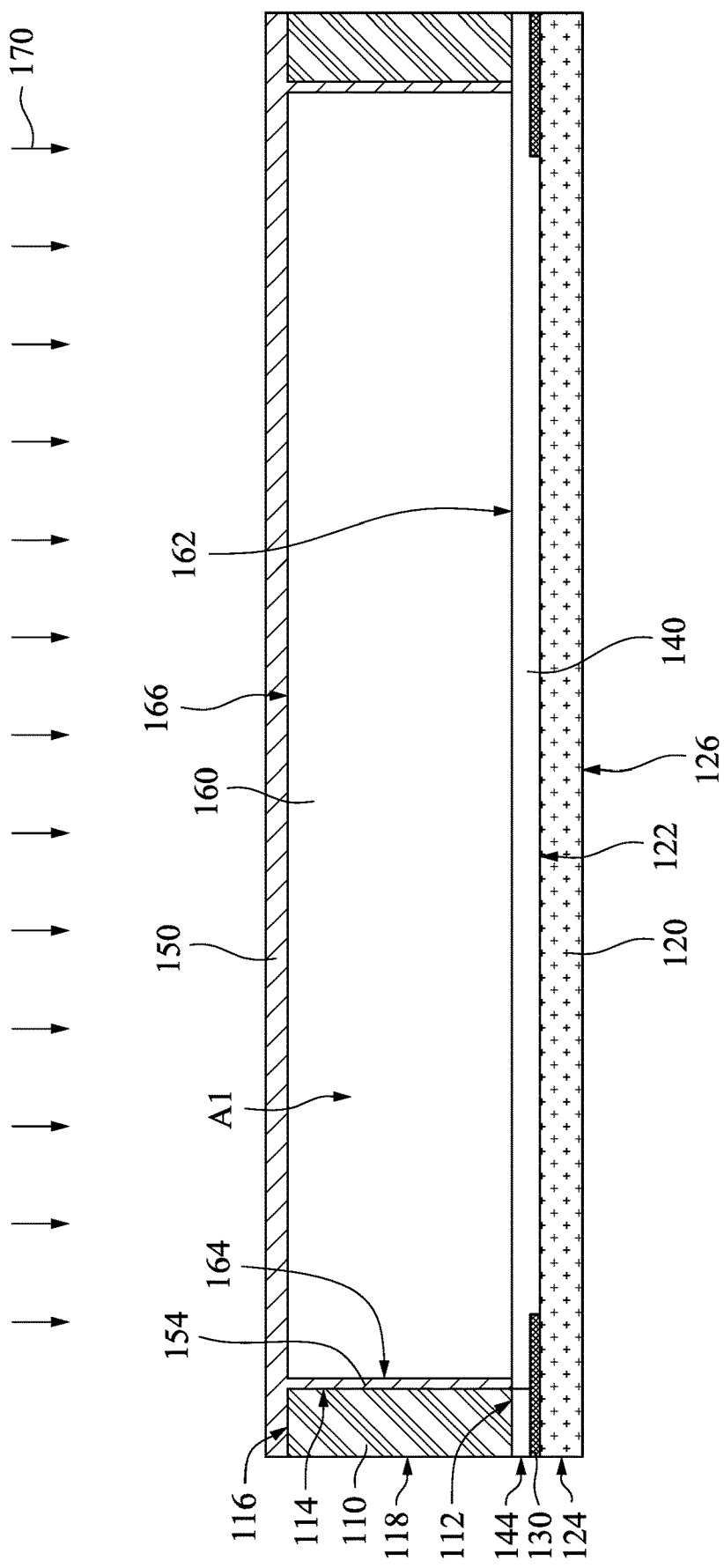

FIGS. 3B to 3D are cross-sectional views of different steps of a fabrication method of the cover structure 100 in FIG. 3A. Reference is made to FIG. 3B, the light blocking coating layer 130 is formed on the surface 122 of the anti-glare layer 120 first. In the present embodiment, the anti-glare layer 120 is a plate. Therefore, the light blocking coating layer 130 may be printed on the anti-glare layer 120. Subsequently, the optical adhesive layer 140 is coated on the surface 122 of the anti-glare layer 120 and the light blocking coating layer 130.

Reference is made to FIG. 3B and FIG. 3C, the light blocking frame 110 and the transparent plate 160 are disposed on the carrier substrate 700. The carrier substrate 700, for example, may be glass substrate. Subsequently, the structure shown in FIG. 3B is attached to the light blocking frame 110 and the transparent plate 160 through the optical adhesive layer 140. During the attach process, the surface 112 of the light blocking frame 110 and the surface 162 of the transparent plate 160 may be pressed so as to be firmly attached with the optical adhesive layer 140 and to be aligned with the optical adhesive layer 140.

Reference is made to FIG. 3A and FIG. 3C, the light blocking frame 110 and the transparent plate 160 are separated from the carrier substrate 700. Subsequently, the light blocking frame 110, the optical adhesive layer 140, and the transparent plate 160 that are attached together are reversed so as to fill the adhesive material therein. The adhesive material may flow into the space between the inner wall 114 of the light blocking frame 110 and the side wall 164 of the transparent plate 160 so as to attach the light blocking frame 110 and the transparent plate 160. As such, the cover structure 100 as shown in FIG. 3A can be formed. The adhesive material, for example, may be optical adhesive.

Reference is made to FIG. 3D, and the embodiment shown in FIG. 3D is another configuration of the embodiment shown in FIG. 3A. In the present embodiment, the adhesive material, for example, may be ultra-violet curing glue (UV curing glue). The adhesive layer 150 covers the surface 116 of the light blocking frame 110 and the surface 166 of the transparent plate 160, and the adhesive layer 150 includes an extension portion 154 located between the light blocking frame 110 and the side wall 164 of the transparent plate 160. Subsequently, the adhesive material is cured by the UV light 170 so as to form the adhesive layer 150. In addition, the light blocking frame 110 and the transparent plate 160 are attached through the extension portion 154 of the adhesive layer 150.

Figure 4A:
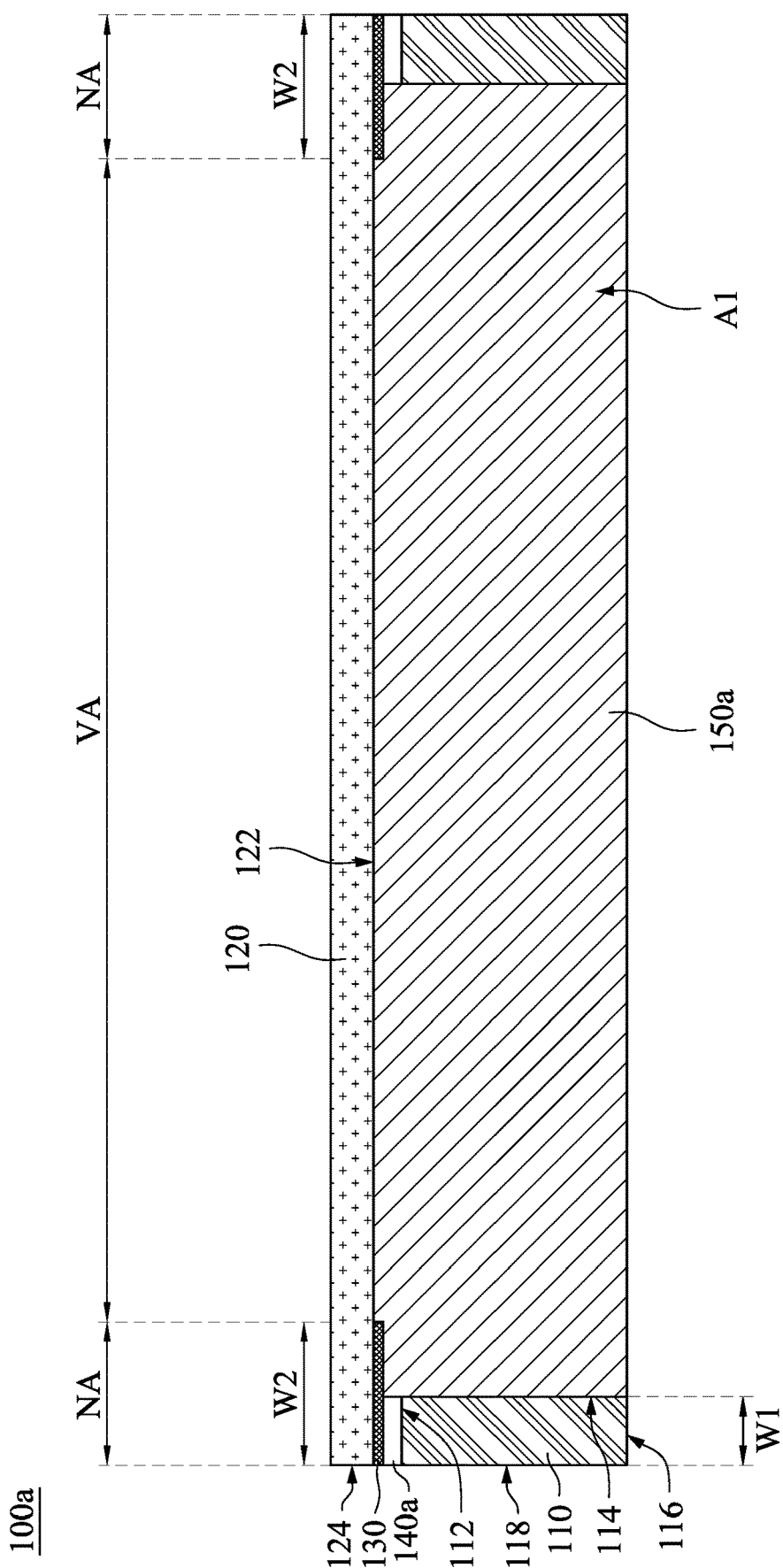
FIG. 4A is a cross-sectional view of a cover structure according to another embodiment of the present disclosure.

FIG. 4A is a cross-sectional view of a cover structure 100a according to another embodiment of the present disclosure. The cover structure 100a is similar to the cover structure 100 as shown in FIG. A, the difference is that the optical adhesive layer 140a of the cover structure 100a is merely located on the surface 122 of the light blocking frame 110, and the cover structure 100a has no transparent plate 160 (see FIG. 3A). That is, the adhesive layer 150a is filled in the spaced collectively surrounded by the light blocking coating layer 130, the optical adhesive layer 140a, and the light blocking frame 110. In addition, the adhesive layer 150a may fill the step produced by the anti-glare layer 120, the light blocking coating layer 130, and the optical adhesive layer 140a. The light blocking frame 110 of the cover structure 100a is substantially the same as the light blocking frame 110 as shown in FIG. 3A. Therefore, the cover structure 100a has the same advantages as the cover structure 100, and the description is not repeated hereinafter.

Figure 4B:
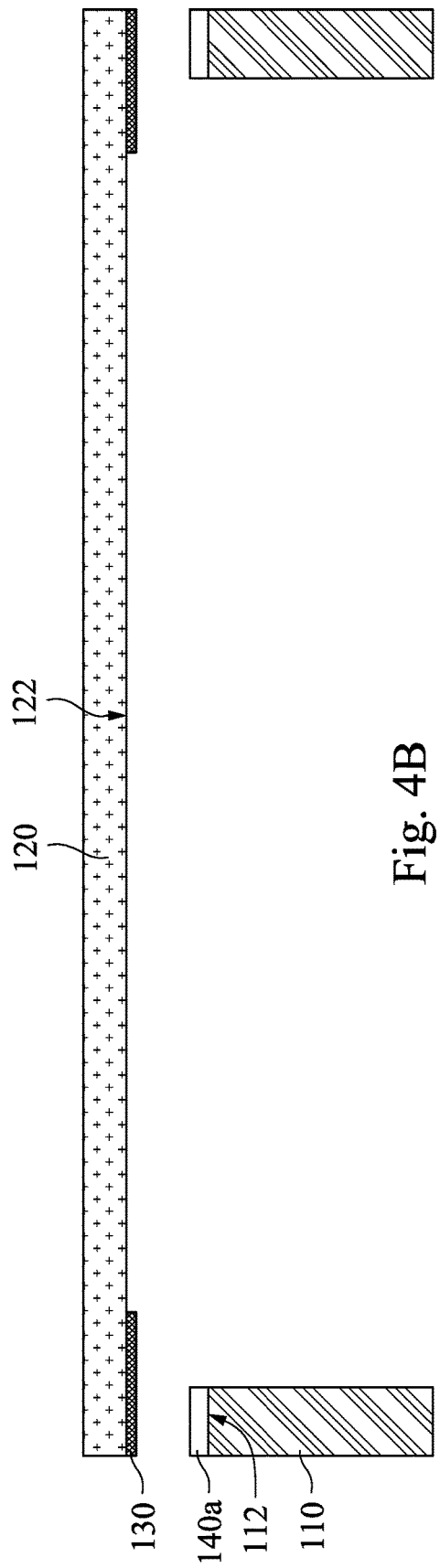
FIGS. 4B to 4D are cross-sectional views of different steps of a fabrication method of the cover structure in FIG. 4A.
Figure 4C:
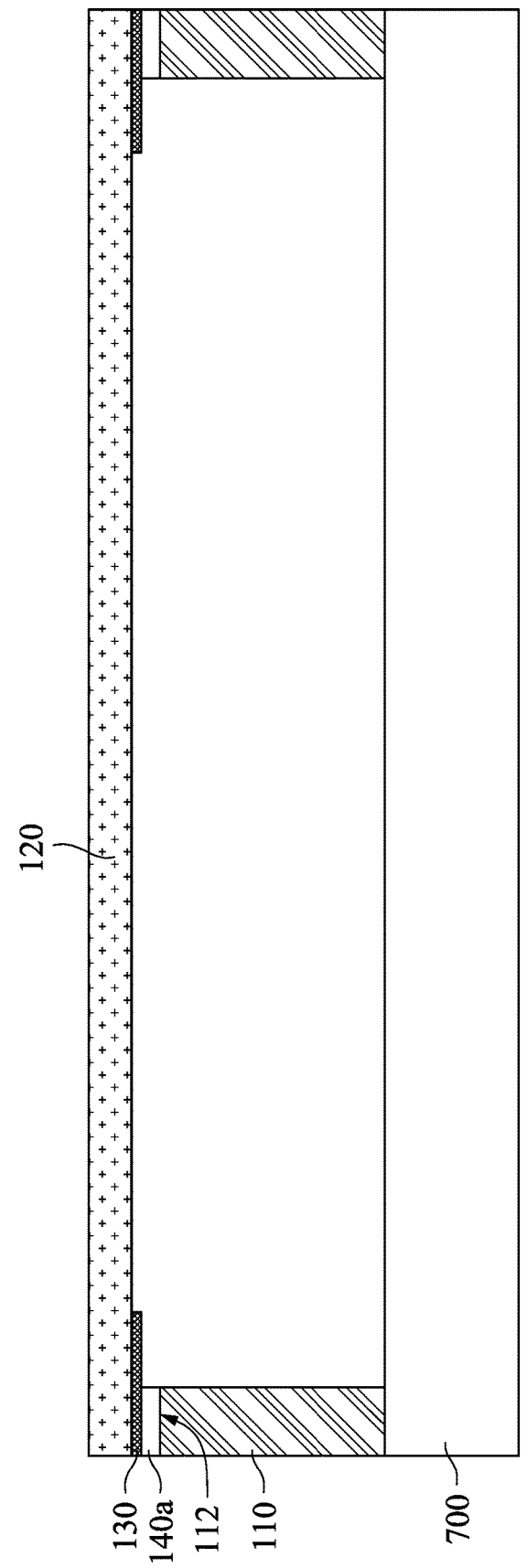
Figure 4D:
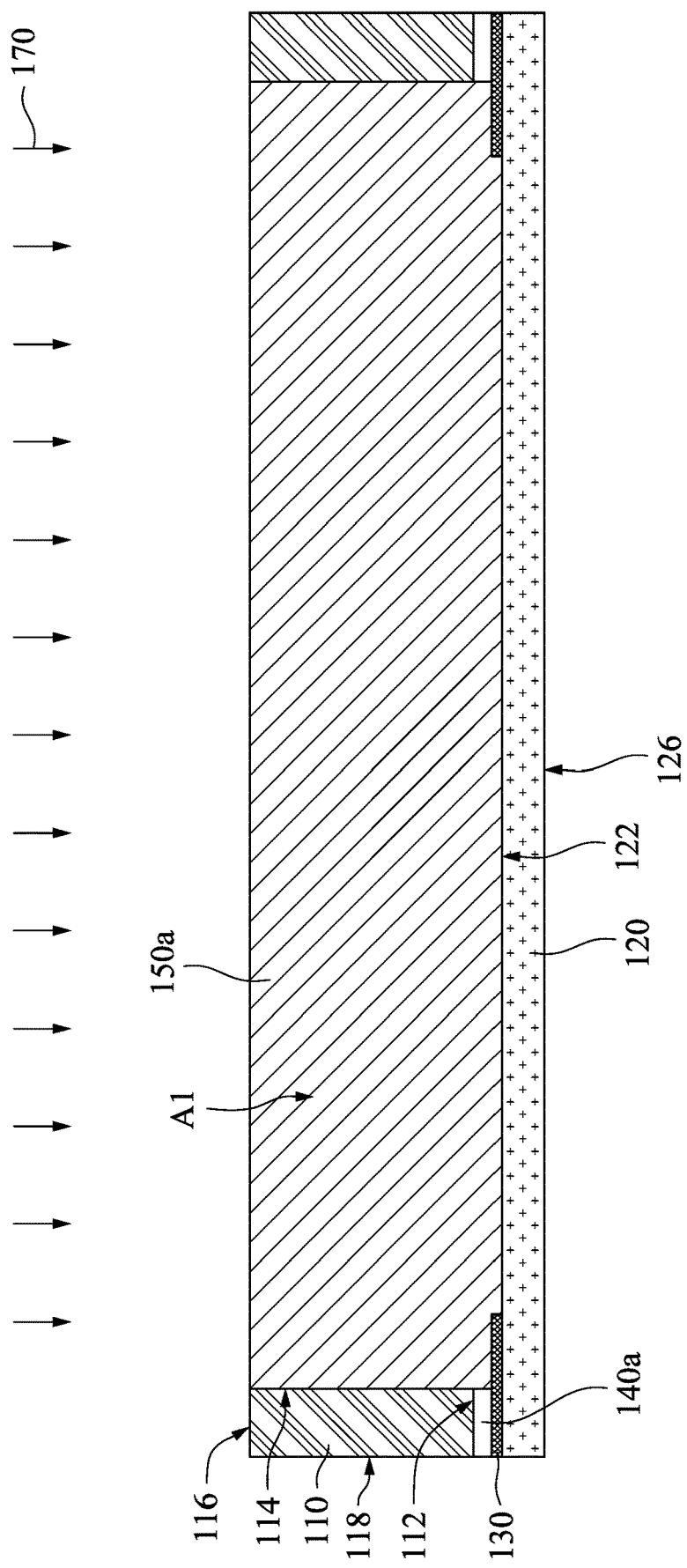

FIGS. 4B to 4D are cross-sectional views of different steps of a fabrication method of the cover structure 100a in FIG. 4A. Reference is made to FIG. 4B, the light blocking coating layer 130 is formed on the surface 122 of the anti-glare layer 120 first, and the optical adhesive layer 140a is attached on the surface 122 of the light blocking frame 110.

Reference is made to FIG. 4C, the light blocking frame 110 and the optical adhesive layer 140a are disposed on the carrier substrate 700. Subsequently, the light blocking coating layer 130 on the anti-glare layer 120 is attached with the optical adhesive layer 140a. The attached structure may be pressed such that the optical adhesive layer 140a can be firmly attached with the light blocking coating layer 130 on the anti-glare layer 120.

Reference is made to FIG. 4D, the light blocking frame 110 is separated from the carrier substrate 700. Subsequently, the anti-glare layer 120, the light blocking coating layer 130, and the light blocking frame 110 that are attached together are reversed so as to fill the adhesive material therein. The adhesive material may be filled in the space collectively surrounded by the light blocking coating layer 130, optical adhesive layer 140a, and the light blocking frame 110, and the adhesive material may be in contact with the surface 122 of the anti-glare layer 120. The adhesive material, for example, may be UV curing glue. Subsequently, the adhesive material is cured by the UV light 170 so as to form the adhesive layer 150a. As described in the embodiment shown in FIG. 3D, a portion of the adhesive layer 150a may cover the surface 116 of the light blocking frame 110.

Figure 5:
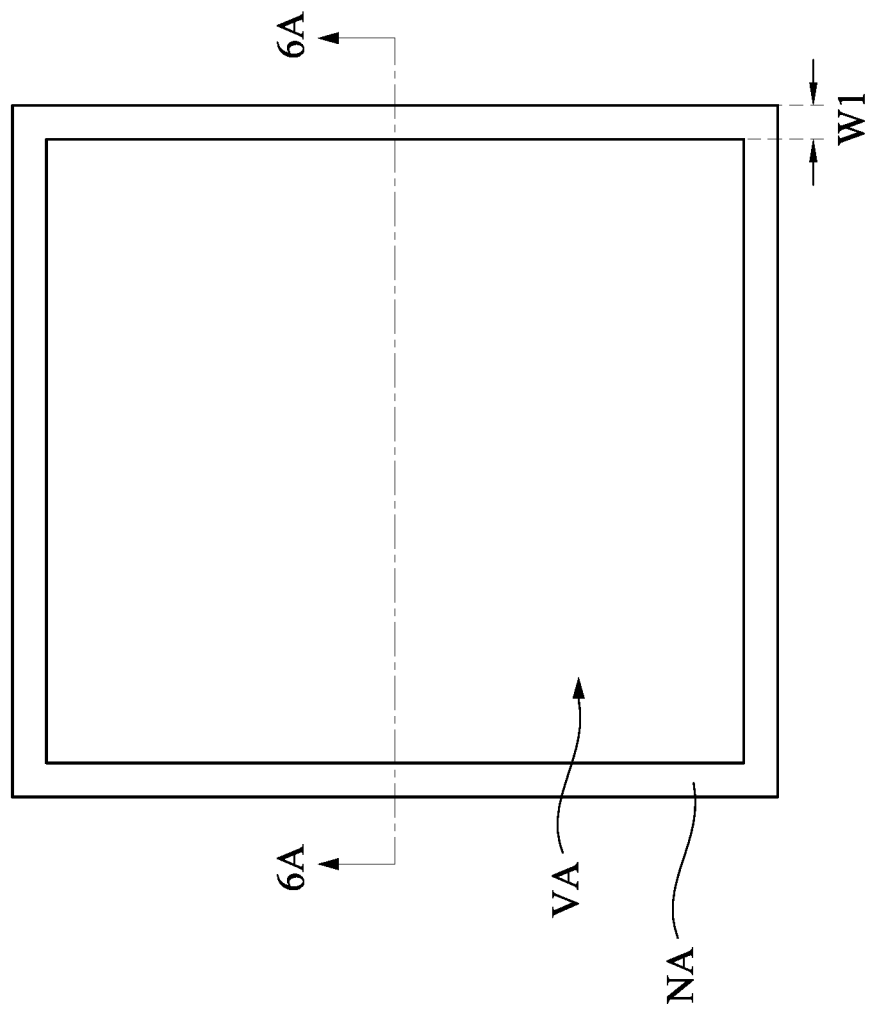
FIG. 5 is a top view of a cover structure according to another embodiment of the present disclosure.
Figure 6A:
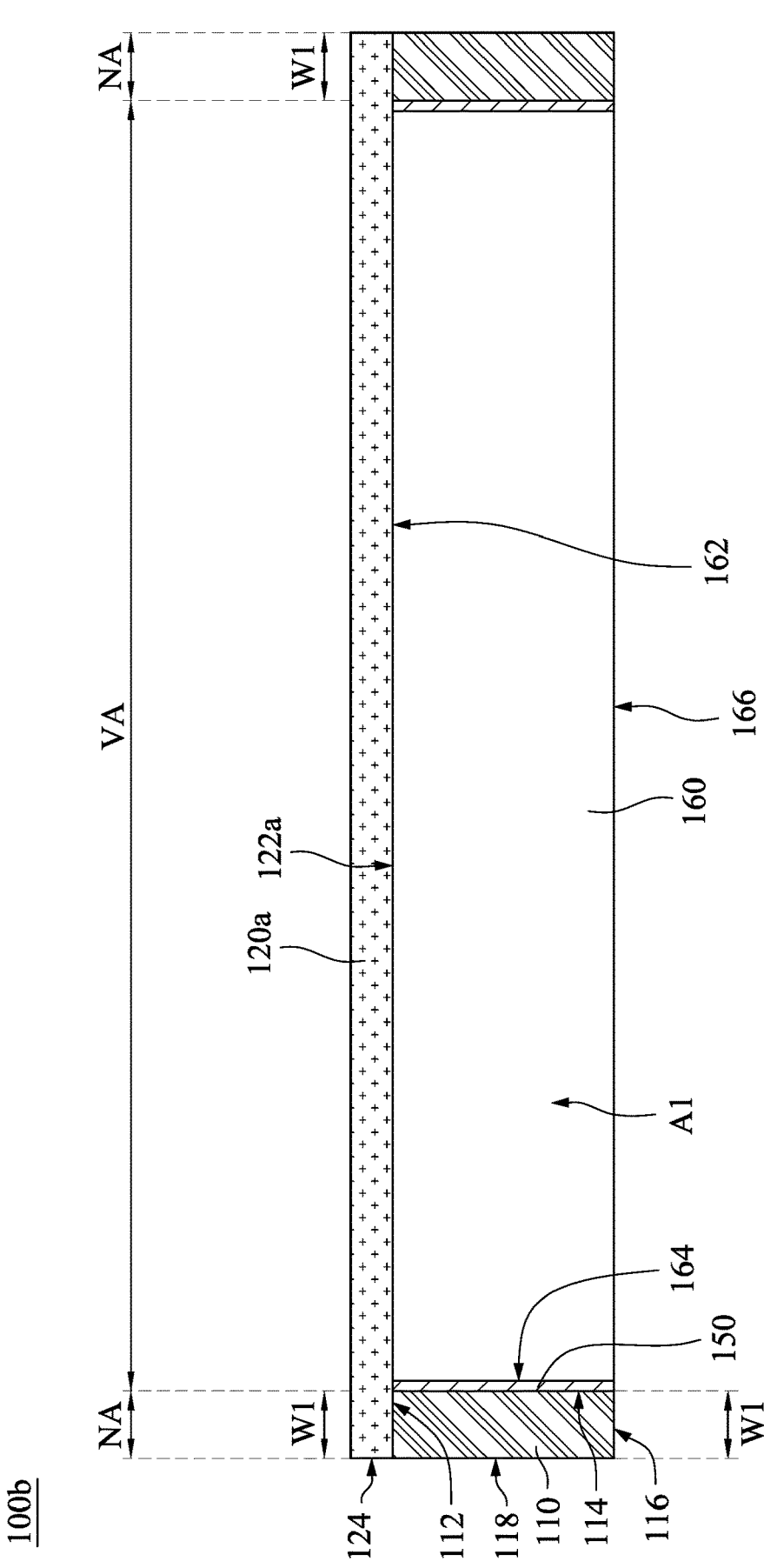
FIG. 6A is a cross-sectional view taken along line 6A-6A in FIG. 5.

FIG. 5 is a top view of a cover structure 100b according to another embodiment of the present disclosure. FIG. 6A is a cross-sectional view taken along line 6A-6A in FIG. 5. Reference is made to FIG. 5 and FIG. 6A. The cover structure 100b is similar to the cover structure 100 as shown in FIG. A, the difference is that the cover structure 100b has no light blocking coating layer 130 and the optical adhesive layer 140 (see FIG. 3A). In the present embodiment, the anti-glare layer 120a is in contact with the surface 112 of the light blocking frame 110 facing the anti-glare layer 120a and the surface 162 of the transparent plate 160. In other words, the surface 112 of the light blocking frame 110 is aligned with the surface 162 of the transparent plate 160. As shown in FIG. 5, the non-display region NA of the cover structure 100b is defined by the light blocking frame 110. That is, the orthogonal projection of the light blocking frame 110 on the anti-glare layer 120a is the non-display region NA. The width W1 of the light blocking frame 110 is equal to the width W1 of the non-display region NA. The light blocking frame 110 of the cover structure 100b is substantially the same as the light blocking frame 110 as shown in FIG. 3A. Therefore, the cover structure 100b has the same advantages as the cover structure 100, and the description is not repeated hereinafter.

Figure 6B:
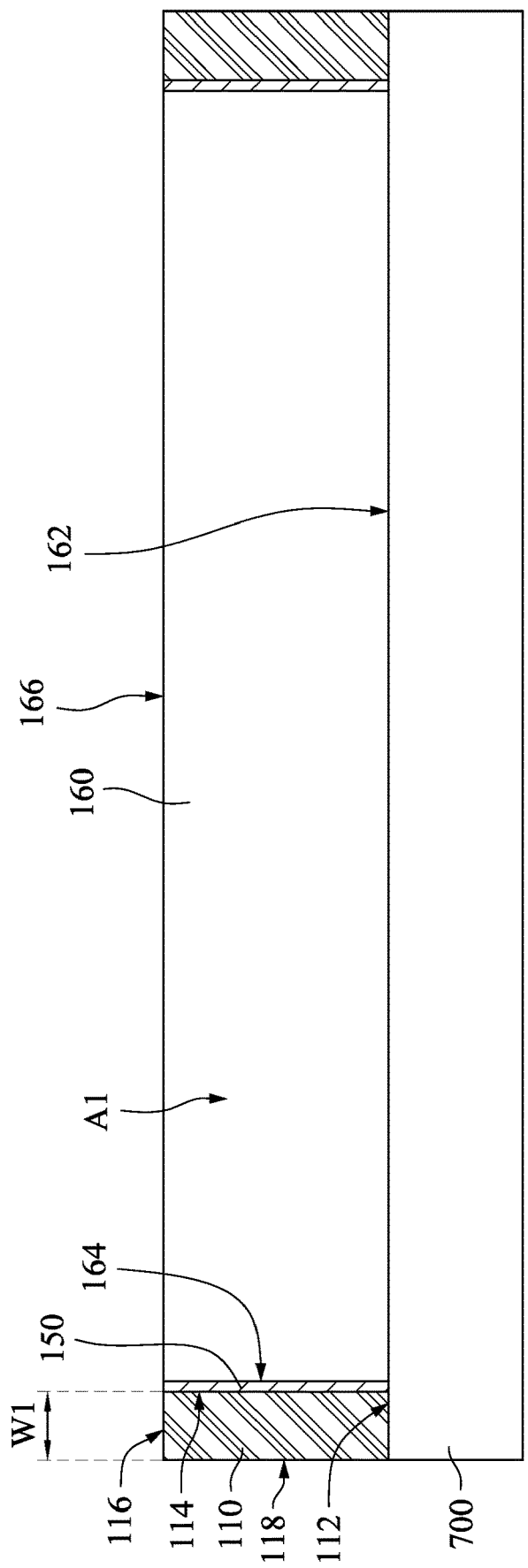
FIGS. 6B to 6C are cross-sectional views of different steps of a fabrication method of the cover structure in FIG. 6A.
Figure 6C:
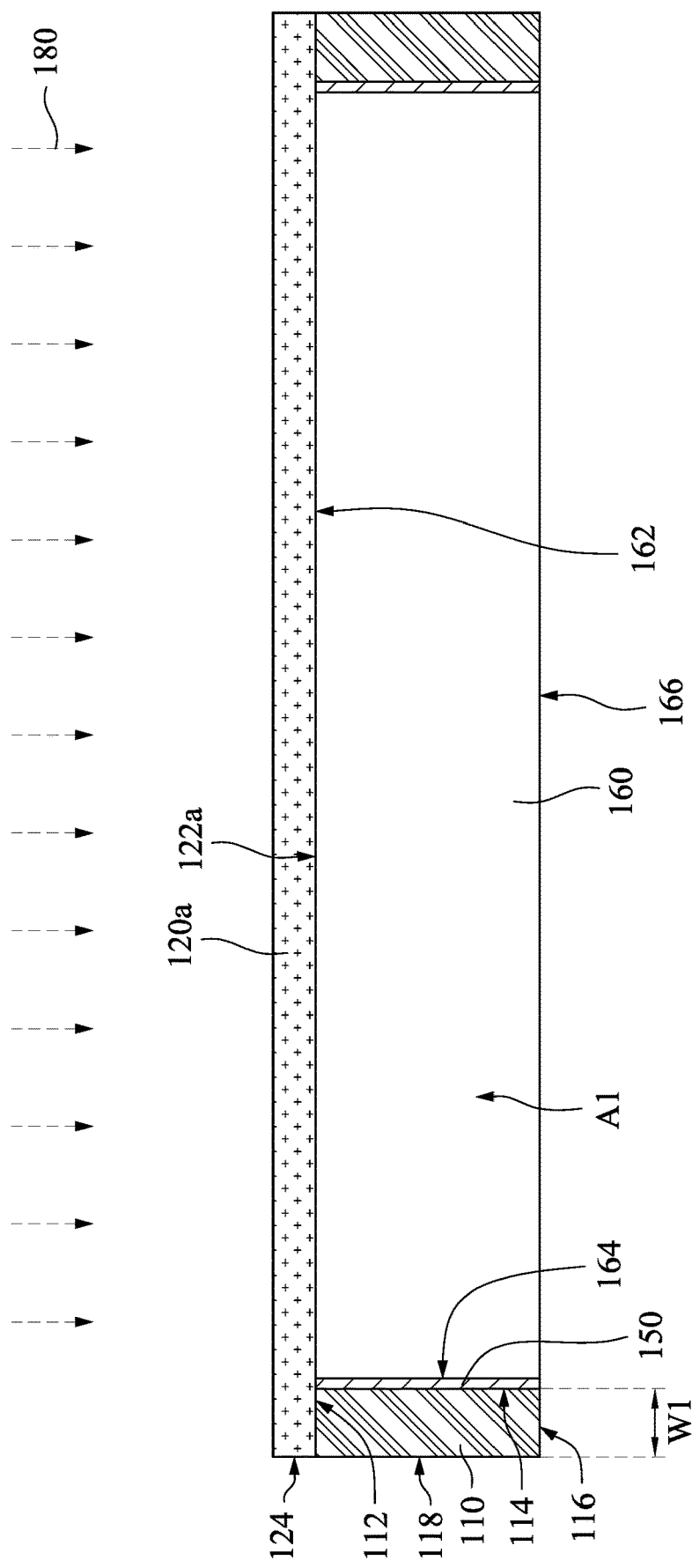

FIGS. 6B to 6C are cross-sectional views of different steps of a fabrication method of the cover structure 100b in FIG. 6A. Reference is made to FIG. 6B, the light blocking frame 110 and the transparent plate 160 are disposed on the carrier substrate 700. Subsequently, the adhesive material is filled therein. The adhesive material may flow into the space between the inner wall 114 of the light blocking frame 110 and the side wall 164 of the transparent plate 160 so as to attach the light blocking frame 110 and the transparent plate 160. As described in the embodiment shown in FIG. 3D, a portion of the adhesive layer 150 may cover the surface 116 of the light blocking frame 110 and the surface 166 of the transparent plate 160.

Reference is made to FIG. 6C, the light blocking frame 110, the transparent plate 160, and the adhesive layer 150 that are attached together are separated from the carrier substrate 700. Subsequently, the light blocking frame 110, the transparent plate 160, and the adhesive layer 150 that are attached together are reversed so as to imprint the UV coating layer and to perform the curing process 180. As such, the anti-glare layer 120a is formed, and the anti-glare layer 120a is located on the surface 112 of the light blocking frame 110 and the surface 162 of the transparent plate 160.

Figure 7:
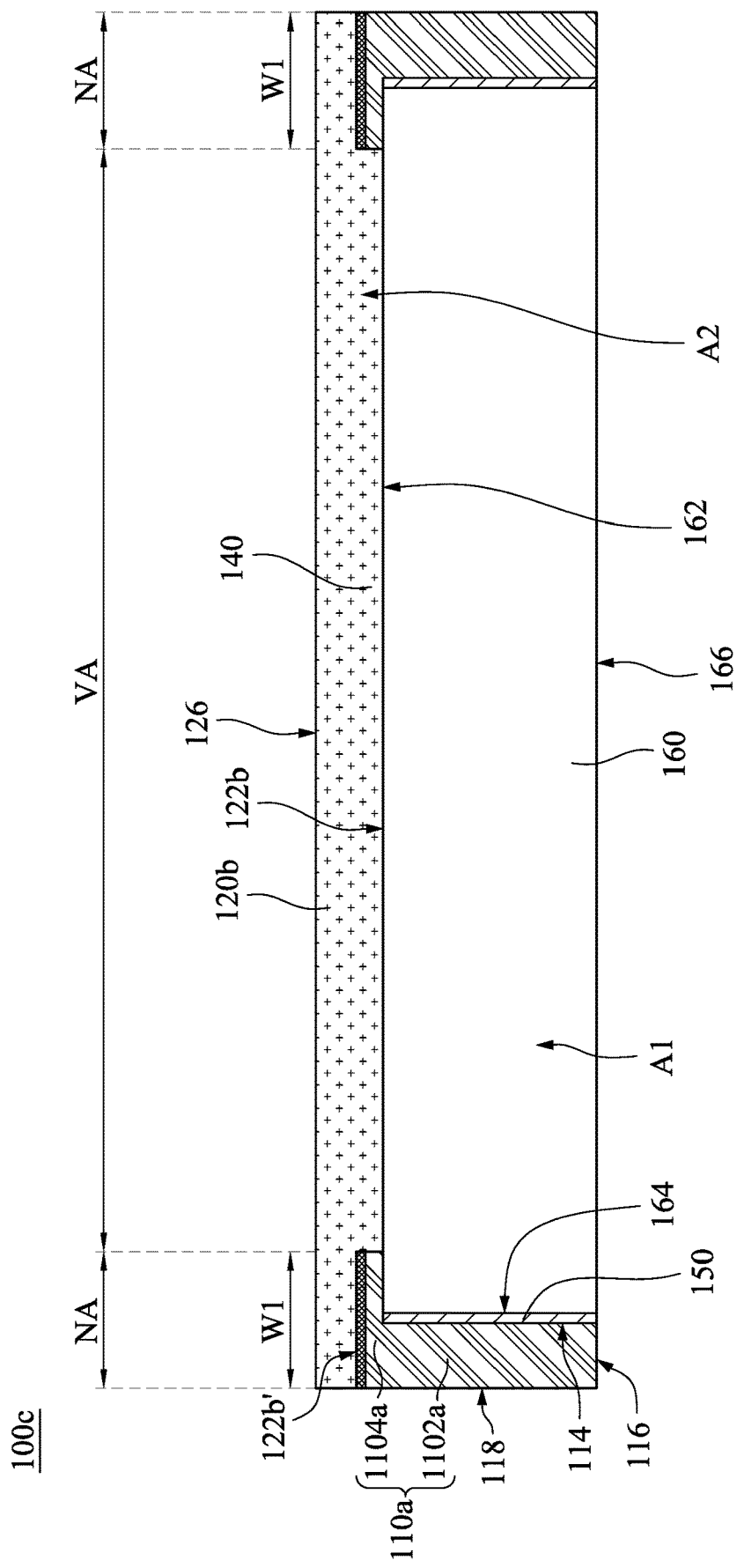
FIG. 7 is a cross-sectional view of a cover structure according to another embodiment of the present disclosure.

FIG. 7 is a cross-sectional view of a cover structure 100c according to another embodiment of the present disclosure. The cover structure 100c is similar to the cover structure 100b as shown in FIG. 6A, the difference is that the light blocking frame 110a of the cover structure 100c includes a body portion 1102a and an extension portion 1104a. The body portion 1102a of the light blocking frame 110a surrounds the transparent plate 160, and the extension portion 1104a of the light blocking frame 110a is located between the anti-glare layer 120b and the transparent plate 160. In the present embodiment, the extension portion 1104a of the light blocking frame 110a is located on the surface 162 of the transparent plate 160.

In the present embodiment, the extension portion 1104a of the light blocking frame 110a has a receiving space A2, and a portion of the anti-glare layer 120b is located in the receiving space A2. The anti-glare layer 120b includes a surface 122b facing and in contact with the transparent plate 160. The anti-glare layer 120b includes a surface 122b' facing and in contact with the extension portion 1104a of the light blocking frame 110a. A thickness of a portion of the anti-glare layer 120b that is overlapped with the transparent plate 160 is greater than a thickness of another portion of the anti-glare layer 120b that is overlapped with the light blocking frame 110a. In other words, the step difference between the extension portion 1104a of the light blocking frame 110a and the transparent plate 160 is filled by the anti-glare layer 120a.

In the present embodiment, the orthogonal projection of the extension portion 1104a of the light blocking frame 110a on the anti-glare layer 120a is the non-display region NA of the cover structure 100c. In other words, in the view of FIG. 5, the width W1 of the extension portion 1104a of the light blocking frame 110a is equal to the width W1 of the non-display region NA. The orthogonal projection of the transparent plate 160 on the anti-glare layer 120a is partially overlapped with the non-display region NA. That is, in the view of FIG. 7, the side wall 164 of the transparent plate 160, the inner wall 114 of the body portion 1102a of the light blocking frame 110a, and the adhesive layer 150 may be blocked by the extension portion 1104a of the light blocking frame 110a. With such design, the poor display quality or non-uniform color between the side wall 164 of the transparent plate 160, the inner wall 114 of the light blocking frame 110a, and the adhesive layer 150 due to deviation of mediums of those layers may be prevented. In other words, defect of display image caused by the interface between the transparent plate 160 and the light blocking frame 110a may be prevented by employing such design. As described about the cover structure 100 above, the light blocking frame 110a of the cover structure 100c may also block or absorb light. Therefore, the cover structure 100c has the same advantages as the cover structure 100, and the description is not repeated hereinafter.

Figure 8A:
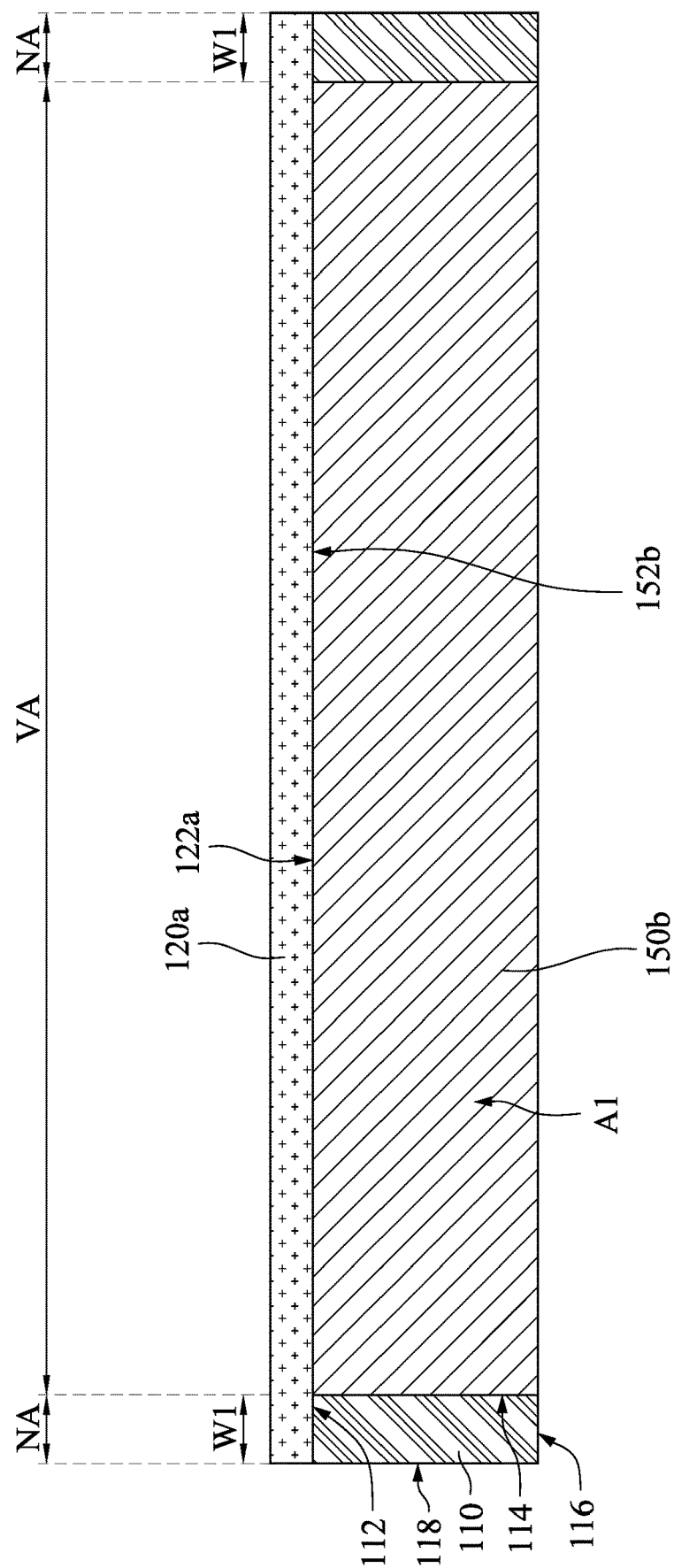
FIG. 8A is a cross-sectional view of a cover structure according to another embodiment of the present disclosure.

FIG. 8A is a cross-sectional view of a cover structure 100d according to another embodiment of the present disclosure. The cover structure 100d is similar to the cover structure 100b as shown in FIG. 6A, the difference is that the cover structure 100d has no transparent plate 160 (see FIG. 6A). In the present embodiment, the surface 122a of the anti-glare layer 120a facing the receiving space A1 of the light blocking frame 110 is in contact with the adhesive layer 150ab. That is, the adhesive layer 150a is filled in the space collectively surrounded by the anti-glare layer 120a and the light blocking frame 110. The light blocking frame 110 of the cover structure 100d is substantially the same as the light blocking frame 110 as shown in FIG. 3A. Therefore, the cover structure 100d has the same advantages as the cover structure 100, and the description is not repeated hereinafter.

Figure 8B:
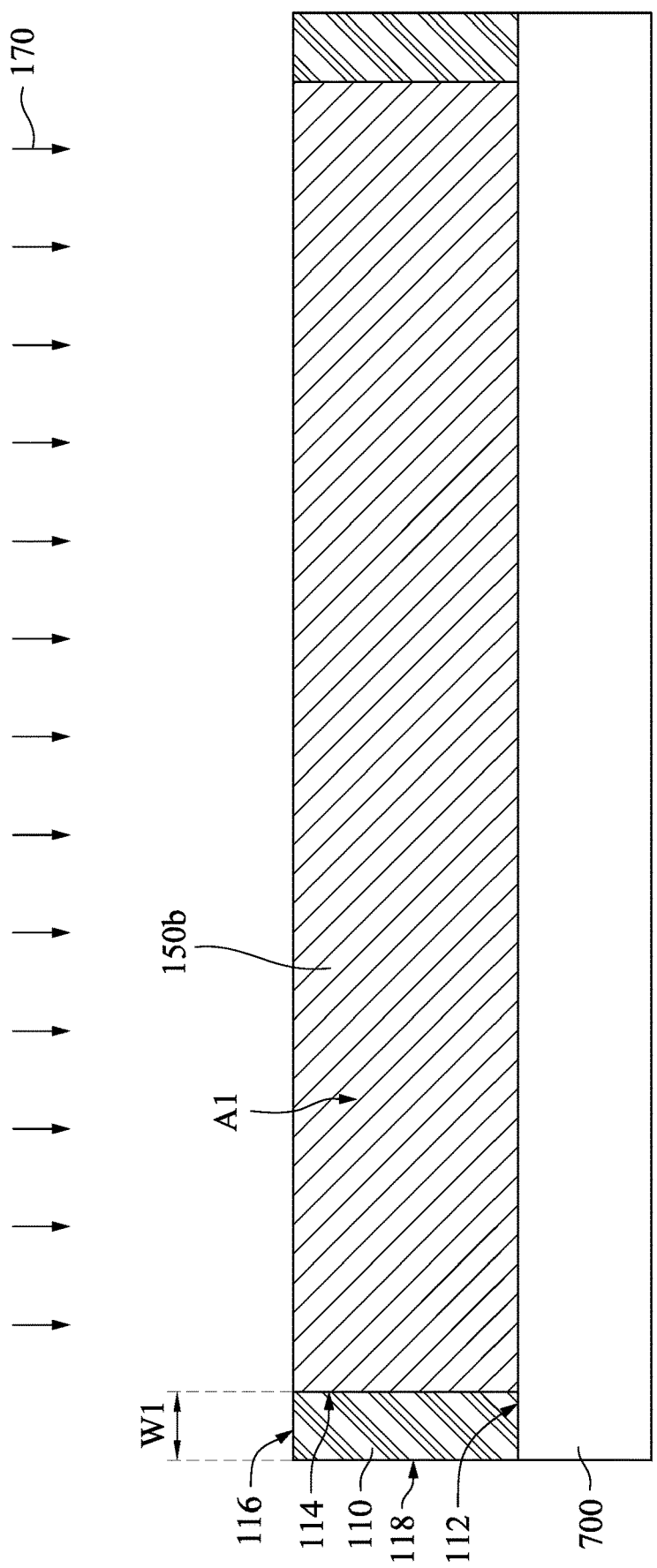
FIGS. 8B to 8C are cross-sectional views of different steps of a fabrication method of the cover structure in FIG. 8A.
Figure 8C:
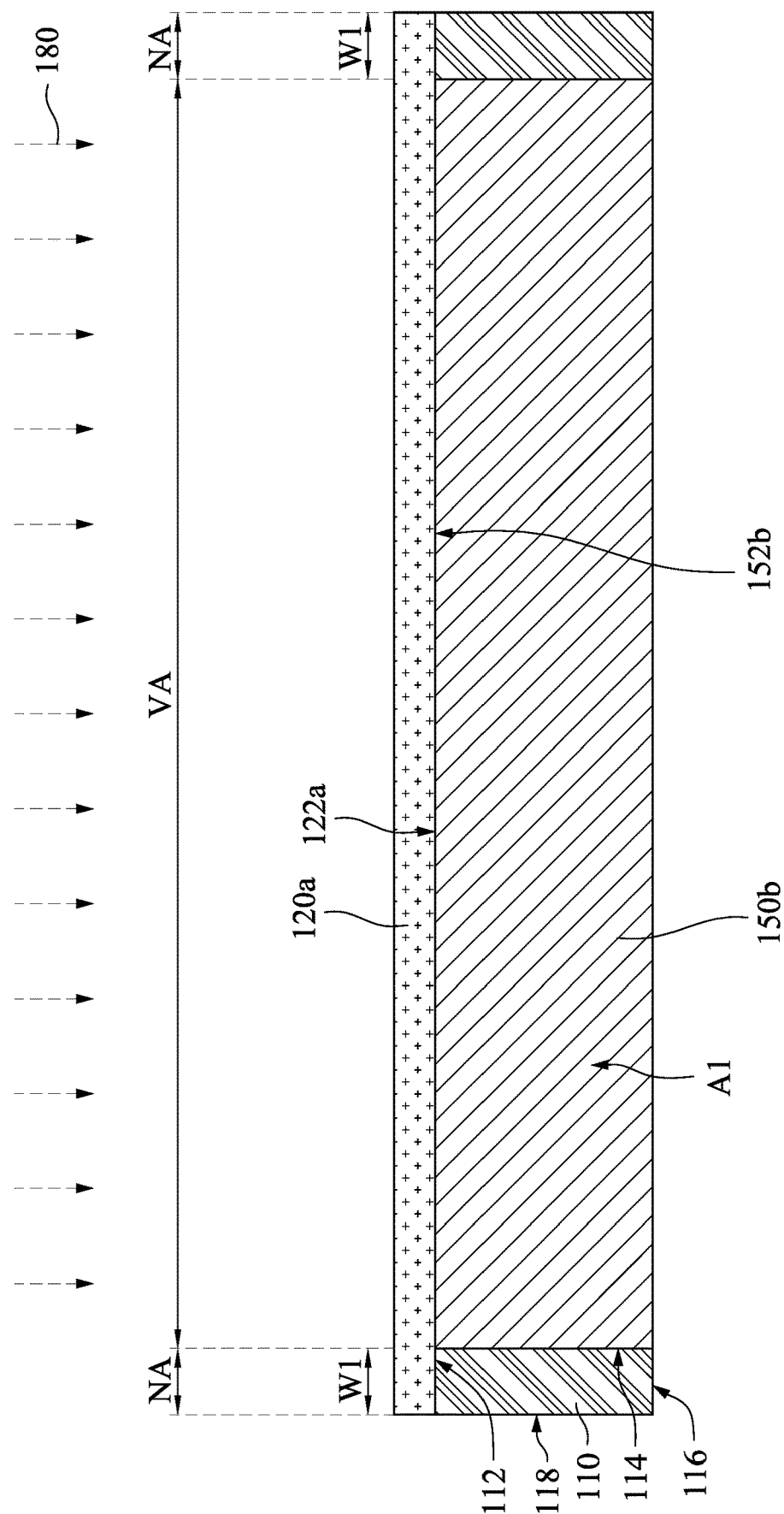

FIGS. 8B to 8C are cross-sectional views of different steps of a fabrication method of the cover structure 100d in FIG. 8A. Reference is made to FIG. 8B, the light blocking frame 110 is disposed on the carrier substrate 700. Subsequently, the adhesive material is filled so as to cover the surface 116 of the light blocking frame 110 and the carrier substrate 700. The adhesive material, for example, may be UV curing glue. Subsequently, the adhesive material is cured by the UV light 170 so as to form the adhesive layer 150b.

Reference is made to FIG. 8C, the light blocking frame 110 and the adhesive layer 150b that are attached together are separated from the carrier substrate 700. Subsequently, the light blocking frame 110 and the adhesive layer 150b are reversed so as to imprint the UV coating layer to perform the curing process 180. As such, the anti-glare layer 120a is formed, and the anti-glare layer 120a is located on the surface 112 of the light blocking frame 110 and the surface 152b of the adhesive layer 150b. As described in the embodiment shown in FIG. 3D, a portion of the adhesive layer 150b may cover the surface 116 of the light blocking frame 110.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
 a cover structure, comprising:
 an anti-glare layer having a display region and a non-display region;
 a light blocking frame surrounding a receiving space, wherein an orthogonal projection of the light blocking frame on the anti-glare layer is located within the non-display region; and
 an adhesive layer located in the receiving space of the light blocking frame;
 a light guide plate located on the surface of the adhesive layer facing away from the anti-glare layer;
 a display panel adjacent to the light guide plate;
 a light blocking coating layer located between the light blocking frame and the anti-glare layer; and
 an optical adhesive layer at least located between the light blocking coating layer and the light blocking frame.

2. The display device of claim 1, wherein the light blocking frame has an inner wall, the light blocking frame surrounds the adhesive layer, and the adhesive layer is in contact with the inner wall.

3. The display device of claim 1, wherein a surface of the anti-glare layer facing the receiving space is in contact with the adhesive layer.

4. The display device of claim 1, wherein an orthogonal projection of the light blocking coating layer on the anti-glare layer is overlapped with the non-display region.

5. The display device of claim 1, wherein an orthogonal projection of the light blocking frame on the anti-glare layer is overlapped with the non-display region.

6. The display device of claim 1, wherein an orthogonal projection of the light blocking coating layer on the anti-glare layer is overlapped with an entirety of the orthogonal projection of the light blocking frame on the anti-glare layer.

7. The display device of claim 1, wherein a surface of the anti-glare layer facing the light blocking frame is in contact with the optical adhesive layer.

8. The display device of claim 1, wherein an orthogonal projection of the optical adhesive layer on the anti-glare layer is overlapped with the display region.

9. The display device of claim 1, further comprising:
 a transparent plate located in the receiving space, and the transparent plate is in contact with the optical adhesive layer.

10. The display device of claim 8, wherein an orthogonal projection of the transparent plate on the anti-glare layer is overlapped with the orthogonal projection of the light blocking coating layer on the anti-glare layer.

11. The display device of claim 1, wherein the optical adhesive layer and the light blocking frame collectively surround the adhesive layer.

12. The display device of claim 1, wherein the anti-glare layer is in contact with a surface of the light blocking frame facing the anti-glare layer.

13. The display device of claim 1, further comprising:
 a transparent plate located in the receiving space, wherein the light blocking frame surrounds the transparent plate, and the transparent plate is in contact with the anti-glare layer.

14. The display device of claim 12, wherein the adhesive layer is located between the transparent plate and the light blocking frame.

15. The display device of claim 12, wherein a part of the light blocking frame is located between the anti-glare layer and the transparent plate.

16. The display device of claim 12, wherein a surface of the light blocking frame facing the anti-glare layer is aligned with a surface of the transparent plate facing the anti-glare layer.

17. The display device of claim 1, further comprising:
 a housing surrounding the cover structure, wherein the light blocking frame is located between the housing and the adhesive layer.

* * * * *